US010879520B2

(12) United States Patent
Nan et al.

(10) Patent No.: US 10,879,520 B2
(45) Date of Patent: Dec. 29, 2020

(54) CELL AND BATTERY

(71) Applicant: Ningde Amperex Technology Limited, Fujian (CN)

(72) Inventors: Haiyang Nan, Fujian (CN); Chuantao Song, Fujian (CN); Zhiwen Xiao, Fujian (CN); Zuchao Liu, Fujian (CN); Xinru Su, Fujian (CN); Wei Huang, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 200 days.

(21) Appl. No.: 16/134,010

(22) Filed: Sep. 18, 2018

(65) Prior Publication Data

US 2019/0198852 A1 Jun. 27, 2019

(30) Foreign Application Priority Data

Dec. 21, 2017 (CN) .......................... 2017 1 1397641

(51) Int. Cl.
*H01M 2/34* (2006.01)
*H01M 2/26* (2006.01)

(52) U.S. Cl.
CPC ............ *H01M 2/348* (2013.01); *H01M 2/26* (2013.01); *H01M 2200/10* (2013.01)

(58) Field of Classification Search
CPC ........................ H01M 2/348; H01M 2/0277
See application file for complete search history.

(56) References Cited

U.S. PATENT DOCUMENTS

| 9,425,491 | B2* | 8/2016 | Hong | .................. | H01M 10/637 |
| 2015/0318584 | A1* | 11/2015 | Yebka | ..................... | H01M 2/30 |
| | | | | | 361/679.02 |
| 2016/0218533 | A1* | 7/2016 | Lim | ..................... | H05K 1/0201 |

* cited by examiner

*Primary Examiner* — Amanda C. Walke
(74) *Attorney, Agent, or Firm* — Morgan, Lewis & Bockius LLP (57) ABSTRACT

The present invention discloses a cell and a battery, wherein the cell comprises a body including a first electrode tab; and a choke that triggers after the temperature reaches a certain value to reduce the current passing through it; the choke is electrically connected to the first electrode tab, and a product of the length of connection path from the choke to the first electrode tab and a cooling coefficient of the connection path is smaller than a difference between a first temperature of the first electrode tab and a second temperature of the choke, wherein the second temperature of the choke is a temperature when the choke is triggered. In the above-mentioned cell, if the trigger action of the choke is timely, the body of the cell can be prevented from reaching the overcharge state, and the choke in the above-mentioned cell can further effectively protect the cell.

18 Claims, 4 Drawing Sheets

CELL AND BATTERY

CROSS-REFERENCE TO RELATED APPLICATION

This application claims priority to and benefits of Chinese Patent Application Serial No. 201711397641.5, filed with the State Intellectual Property Office of P. R. China on Dec. 21, 2017, the entire content of which is incorporated herein by reference.

FIELD OF THE APPLICATION

The invention relates to the technical field of battery, in particular, to a cell and a battery.

BACKGROUND OF THE APPLICATION

In cell structure of the prior art, the body of the cell is generally connected in series with a choke. When the body of the cell is abnormally heated, the charging and discharging current of the body of the cell can be cut off or greatly reduced by the choke, thereby protecting the body of the cell.

At present, the choke is generally attached to the body of the cell through a double-sided tape, and is connected to the electrode tab of the cell through the connection terminal and the adapter piece, thereby achieving series connection with the body of the cell. However, the current common problem is that triggering (cutting or greatly reducing the current) action of the choke has a long delay. Therefore, it is often the case that the temperature of the body of the cell has risen abnormally, the choke still does not operate, or the body of the cell has reached the overcharge state when the choke is in operation, and the choke does not have function of protecting the cell.

SUMMARY OF THE APPLICATION

The present invention discloses a cell and a battery used for improving the protection of the cell by the choke.

To achieve the above object, the present invention provides the following technical solution, a cell comprising: a body comprising a first electrode tab; a choke; wherein the choke is electrically connected to the first electrode tab, and length of a connection path of the choke coupled to the first electrode tab is less than a specific value.

The length of the connection path from the choke to the first electrode tab affects the heat conduction speed of the body of the cell to the choke, so that the length of connection path of the choke to the first electrode tab is less than a specific value. Thus, it is ensured that the heat of the body of the cell may be quickly transmitted to the choke for promptly triggering the choke, reducing the current passing through, and protecting the cell.

Optionally, the choke is triggered at a first temperature to reduce a current passing through; product of the length of the path and a cooling coefficient of the path is less than the difference between a second temperature of the first electrode tab and the first temperature of the choke; wherein the first temperature of the choke is a temperature when the choke is triggered, and the second temperature is a temperature of the first electrode tab when the cell is overcharged.

Specifically, assuming that $T_2$ is the second temperature of the first electrode tab, $T_1$ is the first temperature of the choke, L is the length of connection path from the choke to the first electrode tab, $\alpha$ is the cooling coefficient from the choke to the first electrode tab, above cell satisfies the following formula: $L \cdot \alpha < (T_2 - T_1)$, i.e., $T_1 + L \cdot \alpha < T_2$, wherein $T_2$ is the temperature of the first electrode tab when the body is overcharged, $T_1$ is the temperature when the choke is triggered, then $T_1 + L \cdot \alpha$ is the temperature of the first electrode tab when the choke is triggered, further $T_1 + L \cdot \alpha < T_2$ indicates that the cell satisfies: the temperature of the first electrode tab when the choke is triggered is less than the temperature of the first electrode tab when the body is overcharged, that is, the choke has been triggered before the body is overcharged. In summary, in the above-mentioned cell, the triggering action of the choke is relatively timely, and the body may be prevented from reaching the overcharge state. Further, the choke in the above-mentioned cell may effectively protect the body of the cell in time.

Optionally, the choke includes a thermistor that is coupled to a protection circuit to reduce a current passing through the protection circuit when the choke is triggered.

Optionally, the cooling coefficient of the connection path is 0.5° C./mm to 1.5° C./mm.

Optionally, the choke is directly electrically connected to the first electrode tab.

Optionally, a first connection terminal is further comprised, the choke is electrically connected to the first connection terminal, and the first connection terminal is electrically connected to the first electrode tab.

Optionally, an adapter piece is further comprised, the first connection terminal is electrically connected to the adapter piece, and the adapter piece is electrically connected to the first electrode tab.

Optionally, the connection path of the choke to the first electrode tab is connected by welding, and the weld area of each weld zone is not less than 10% of the overlap area of the two weld bodies in the weld zone.

Optionally, the materials of the first connection terminal and the adapter piece are copper materials.

Optionally, the surfaces of the first connection terminal and the adapter piece are coated with at least one of diamond, graphite, and silicon material.

Optionally, at least one of an outer portion of the first connection terminal, an outer portion of the adapter piece, and an outer portion of the first electrode tab is covered with a porous material layer.

Optionally, a second connection terminal is further comprised, the choke is electrically connected to the second connection terminal; the body further includes a second electrode tab opposite to the first electrode tab; the second connection terminal is located between the first electrode tab and the second electrode tab; or the first electrode tab is located between the second electrode tab and the second connection terminal.

Optionally, the length of the connection path of the choke coupled to the first electrode tab is greater than or equal to zero.

The present invention also provides a battery, wherein the battery comprises the cell according to any one of above technical solutions.

DETAILED DESCRIPTION OF THE PREFERRED EXAMPLES

The technical solutions in the embodiments of the present invention will be clearly and completely described hereafter in connection with the drawings in the embodiments of the present invention. It is apparent that the described embodiments are only a part of the embodiments of the present invention, but not all of the embodiments. Based on the embodiments of the present invention, all the other embodiments obtained by those of ordinary skill in the art without inventive effort are within the scope of the present invention.

As shown in FIGS. 1 to 5, a cell provided by embodiments of the present invention can comprise: a body 1 including a first electrode tab 11; a choke 20 being triggered at a first temperature to reduce the current passing through the choke 20; the choke 20 is coupled to the first electrode tab 11 of the body 1 and the length of the path of the choke 20 coupled to the first electrode tab 11 is less than a specific value. The length of the path of the choke 20 coupled to the first electrode tab 11 can affect the heat conduction speed of the body 1 of the cell to the choke 20, so that the length of the connection path of the choke 20 to the first electrode tab 11 is less than a specific value. Thus, it can be ensured that the heat of the body 1 of the cell may be quickly transmitted to the choke 20 for promptly triggering the choke 20, reducing the current passing through it, and protecting the cell. The length of the path of the choke 20 coupled to the first electrode tab 11 is greater than or equal to zero.

A product of the length of the path of the choke 20 coupled to the first electrode tab 11 and a cooling coefficient of the path is smaller than a difference between a second temperature of the first electrode tab 11 and a first temperature of the choke 20; wherein the second temperature of the first electrode tab 11 is a temperature of the first electrode tab 11 when the body 1 is overcharged, and the first temperature of the choke 20 is a temperature of the choke 20 when the choke 20 is triggered; specifically, wherein the overcharge refers to a critical state in which the temperature of the body of the cell 1 rises to a combustion or explosion reaction.

Specifically, assuming that $T_2$ is the second temperature of the first electrode tab 11, $T_1$ is the first temperature of the choke 20, L is the length of connection path from the choke 20 to the first electrode tab 11, $\alpha$ is the cooling coefficient of the connection path from the choke 20 to the first electrode tab 11, above cell satisfies the following formula: $L \cdot \alpha < (T_2 - T_1)$, i.e., $T_1 + L \cdot \alpha < T_2$, wherein $T_2$ is the temperature of the first electrode tab 11 when the body 1 is overcharged, $T_1$ is the temperature of the choke 20 when the choke 20 is triggered, then $T_1 + L \cdot \alpha$ is the temperature of the first electrode tab 11 when the choke 20 is triggered, further formula $T_1 + L \cdot \alpha < T_2$ indicates that the cell satisfies: the temperature of the first electrode tab 11 when the choke 20 is triggered is less than the temperature of the first electrode tab 11 when the body 1 is overcharged, that is, the choke 20 has been triggered before the body 1 reaches an overcharged state. In summary, in the above-mentioned cell, the triggering action of the choke 20 is relatively timely, and the body 1 may be prevented from reaching the overcharge state. Further, the choke 20 in the above-mentioned cell may effectively protect the body 1 of the cell in time.

The body 1 may comprise an electrode assembly, an electrolyte and a package case, wherein both the electrode assembly and the electrolyte are disposed in the package case. The electrolyte may be an electrolytic solution or a solid electrolyte. The electrode assembly includes a positive electrode, a negative electrode, and a separator, and the separator is disposed between the positive electrode and the negative electrode. The electrode assembly may be a wound cell formed by winding a positive electrode sheet, a negative electrode sheet, and a separator, or a laminated cell formed by stacking a positive electrode sheet, a negative electrode sheet, and a separator. The first electrode tab 11 is disposed on one of the sheets of the electrode assembly, that is, may be disposed on the positive electrode sheet or on the negative electrode sheet.

In a specific embodiment, the choke 20 may include a PTC (Positive Temperature Coefficient) thermistor. PTC thermistor is a typical semiconductor resistor being temperature-sensitive. When a certain temperature (Curie temperature) is exceeded, its resistance increases stepwise with increasing temperature. For example, the ceramic PTC thermistor has a small resistance below the Curie temperature, and its resistance is increased stepwise by 1000 times to a million times above the Curie temperature. When the choke 20 is triggered, the thermistor will be connected to a protection circuit to reduce the current passing through the protection circuit; the protection circuit, that is, a segment of the circuit located in the choke 20 and connected in series with the body 1, belongs to a part of the charge and discharge circuits of the body 1 of the cell.

Specifically, when the choke 20 is not triggered, the charge and discharge current of the body 1 of the cell does not pass through the PTC thermistor, that is, the PTC thermistor is not connected to the charge and discharge circuits of the body 1 of the cell. However, after the choke 20 is triggered, the PTC thermistor is connected to the charge and discharge circuits of the body of the cell 1, so that the resistance in the charge and discharge circuits is greatly increased, and the charge and discharge current is greatly reduced, even close to zero.

In another specific embodiment, the choke 20 may include a thermal switch, such as a metal shrapnel switch; specifically, when the choke 20 is not triggered, the thermal switch is in a closed state, allowing the charge and discharge current to pass through it; when the choke 20 is triggered, the thermal switch is turned off to cause the charge and discharge current to be cut off.

Still further, the choke 20 may also include a current fuse; specifically, when the temperature exceeds a certain temperature, the current fuse is blown, thereby cutting off the charge and discharge current.

As shown in FIGS. 1 to 5, in a specific embodiment, both the second temperature $T_2$ of the first electrode tab 11 when the body 1 is overcharged and the first temperature $T_1$ of the choke 20 when the choke 20 is triggered may be obtained by experimental measurement, for example, the temperature $T_2$ of the first electrode tab when the temperature of the body of the cell 1 rises until a combustion or explosion reaction occurs and the first temperature $T_1$ when the choke 20 is triggered may be directly measured by a hot box.

As shown in FIGS. 1 to 5, in a specific embodiment of the present application, the cooling coefficient $\alpha$ of the connection path from the choke 20 to the first electrode tab 11 may be 0.5-1.5° C./mm; specifically, $\alpha$ is determined by factors such as the connection material and the cross-sectional area of the connection path etc., and may be obtained by experimental measurement and calculation. For example, after testing, the second temperature of the first electrode tab of the cell at one end of the thermally conductive path is 70° C., the temperature of the choke at the other end of the thermally conductive path is 60° C. (wherein temperature difference being 10° C.), and the length of the thermally conductive path is 10 mm, then the thermal conductivity coefficient of the thermally conductive path is $\alpha=10°$ C./10 mm=1° C./mm.

As shown in FIGS. 1 to 5, in a specific embodiment, the head of the body 1 has a top seal 10, the first electrode tab 11 and a second electrode tab 12 extending from the top seal 10; the choke 20 is secured to the top seal 10.

Figure 2:
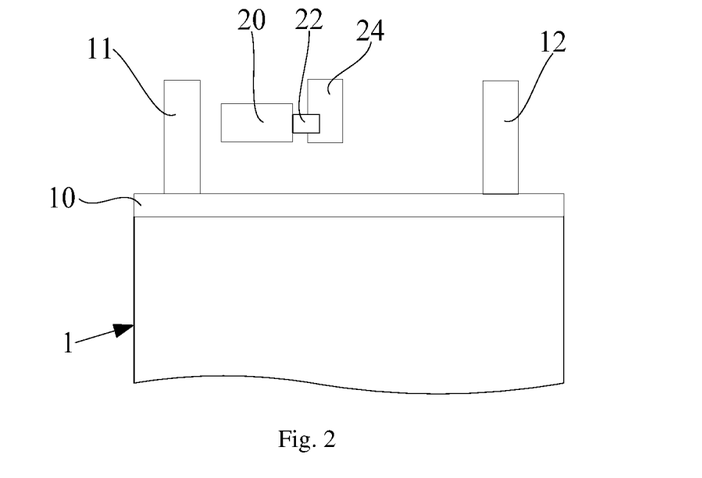
FIG. 2 is a schematic view of structures of a body of the cell and a choke provided in a first embodiment of the present invention.

In a specific embodiment of the present application, the connection path of the choke 20 to the first electrode tab 11 may include the following methods:

Method one: as shown in FIG. 2, the choke 20 is directly electrically connected to the first electrode tab 11.

At this time, the length L of the connection path of the choke 20 to the first electrode tab 11 is 0 mm; therefore, heat is easily conducted to the inside of the choke 20, so that the choke 20 may be triggered in time to effectively protect the cell.

Figure 3:
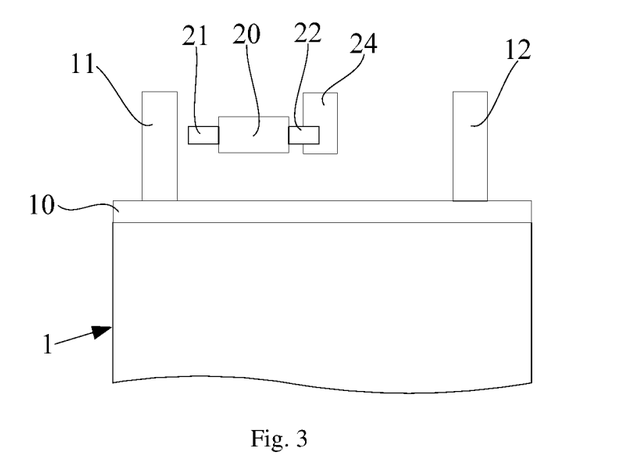
FIG. 3 is a schematic view of structures of a body of the cell and a choke provided in a second embodiment of the present invention.

Method two: as shown in FIG. 3, the cell further comprises a first connection terminal 21, the choke 20 is electrically connected to the first connection terminal 21, and the first connection terminal 21 is electrically connected to the first electrode tab 11.

At this time, the length L of the connection path of the choke 20 to the first electrode tab 11 refers to the length of the first connection terminal 21; further, when the length of the first connection terminal 21 satisfies less than $(T_1-T_2)/\alpha$, the choke 20 may be triggered in time to effectively protect the cell.

Figure 4:
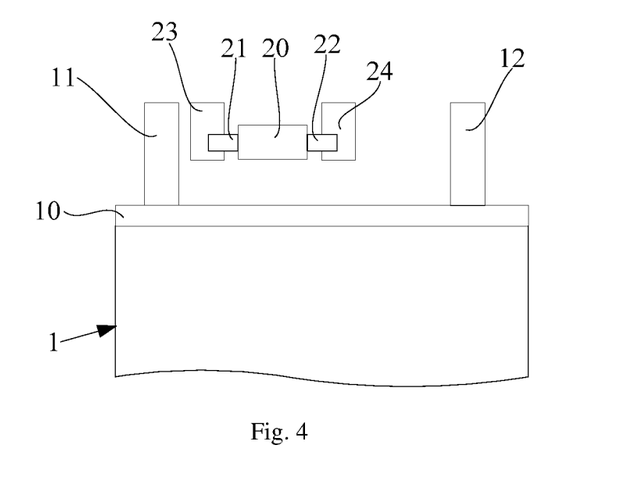
FIG. 4 is a schematic view of structures of a body of the cell and a choke provided in a third embodiment of the present invention.

Method three: as shown in FIG. 4, on the basis of Method two, the cell further comprises an adapter piece 23 therein, the first connection terminal 21 is electrically connected to the adapter piece 23, and the adapter piece 23 is electrically connected to the first electrode tab 11. At this time, the length L of the connection path of the choke 20 to the first electrode tab 11 refers to the total length of the first connection terminal 21 connecting with the adapter piece 23; further, when the total length of the first connection terminal 21 connecting with the adapter piece 23 satisfies less than $(T_1-T_2)/\alpha$, the choke 20 may be triggered in time to effectively protect the cell.

As shown in FIGS. 1 to 5, in a specific embodiment of the present application, the connection path of the choke 20 to the first electrode tab 11 is connected by welding, such as by laser welding or resistance welding; further, the weld area of each weld zone is not less than 10% of the overlap area of the two weld bodies in the weld zone.

Specifically, for example, when the choke 20 is connected to the first electrode tab 11 through the first connection terminal 21 and the adapter piece 23, there are two weld zones on the connection path of the choke 20 to the first electrode tab 11, which are respectively a weld zone between the first connection terminal 21 and the adapter piece 23 and a weld zone between the adapter piece 23 and the first electrode tab 11. At this time, in the two weld zones, the number of welding joints in each weld zone may be greater than four, as long as the weld area in each weld zone may reach 10% or more of the overlap area of the two weld bodies. The larger weld zone may effectively improve the heat transfer efficiency between the two weld bodies, thereby enabling the heat generated by the body 1 to be more timely and efficiently conducted to the choke 20 for triggering, thereby achieving the effect of effectively protecting the cell.

Similarly, when the choke 20 is connected to the first electrode tab 11 through the first connection terminal 21, the number of welding joints in the weld zone between the first connection terminal 21 and the first electrode tab 11 may be greater than four, as long as the weld area thereof is not less than 10% of the overlap area of the first connection terminal 21 and the first electrode tab 11.

As shown in FIGS. 1 to 5, in a specific embodiment of the present application, both the first connection terminal 21 and the adapter piece 23 may be made of a copper (Cu) material. The thermal conductivity coefficient of Cu is relatively high. Specifically, the thermal conductivity coefficient of Cu may reach 377 W/mK at 100° C., and the heat transfer efficiency from the first connection terminal 21 and the adapter piece 23 to the inside of the choke 20 may be greatly improved. Further, compared to the cell in which the first connection terminal 21 and the adapter piece 23 prepared by using nickel (Ni, with a thermal conductivity coefficient of Ni of 57 W/mK at 100° C.) in the prior art, the heat generated by the body 1 provided in the present embodiment may be more effectively and timely transmitted to the inside of the choke 20 for triggering, so that a more effective protection effect on cell may be achieved.

As shown in FIGS. 1 to 5, in another specific embodiment, a material having a higher thermal conductivity coefficient such as diamond, graphite or silicon material may be coated to the surfaces of the first connection terminal 21 and the adapter piece 23 to allow heat to be more efficiently conducted to the inside of the choke 20. Or, the outer portion of the first connection terminal 21, the outer portion of the adapter piece 23, and the outer portion of the first electrode tab 11 are all covered with a porous material layer; that is, the thermally conductive path of the body 1 to the choke 20 is externally coated with a porous material layer. The porous material has a good thermal insulation performance, and using the porous material to cover the thermally conductive path of the body 1 to the choke 20 may effectively reduce the heat loss on the thermally conductive path so as to facilitate the conduction of heat to the inside of the choke 20 more effectively.

As shown in FIGS. 1 to 5, in a specific embodiment of the present application, the cell may further include a second connection terminal 22 therein, the second connection terminal 22 is electrically connected to the choke 20, and the first connection terminal 21 and the second connection terminal 22 are connected by the choke 20 to form a current path for being connected into the charge and discharge circuits of the body 1 of the cell.

Further, the cell may also comprise a turn-out piece 24, and the turn-out piece 24 is electrically connected to the second connection terminal 22 for conducting the charge and discharge current to the external electrical appliances.

Specifically, the body 1 may further comprise a second electrode tab 12, and the polarities of the second electrode tab 12 and the first electrode tab 11 are opposite.

Figure 1:
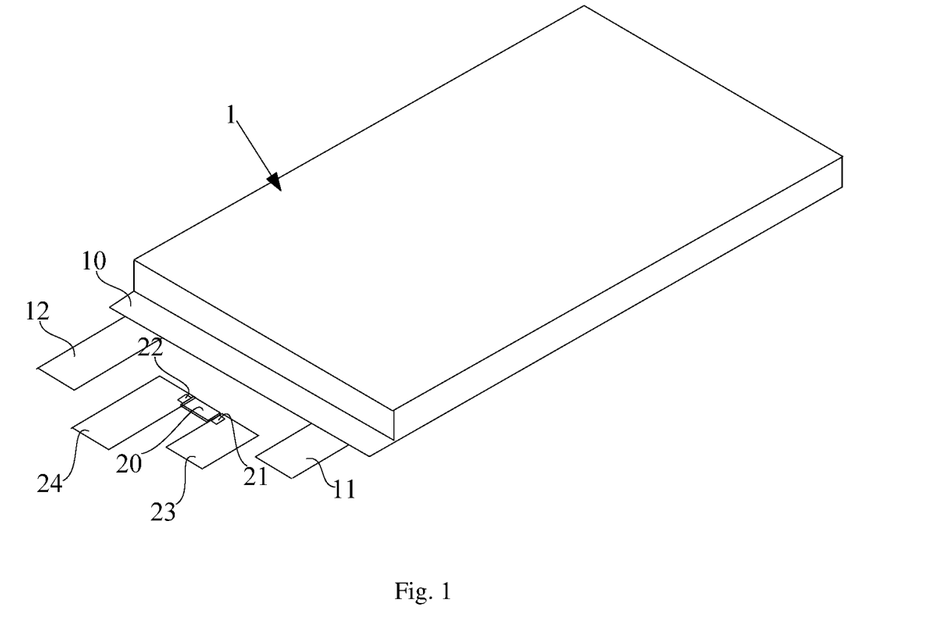
FIG. 1 is a schematic view of a structure of a cell provided by embodiments of the present invention.
Figure 5:
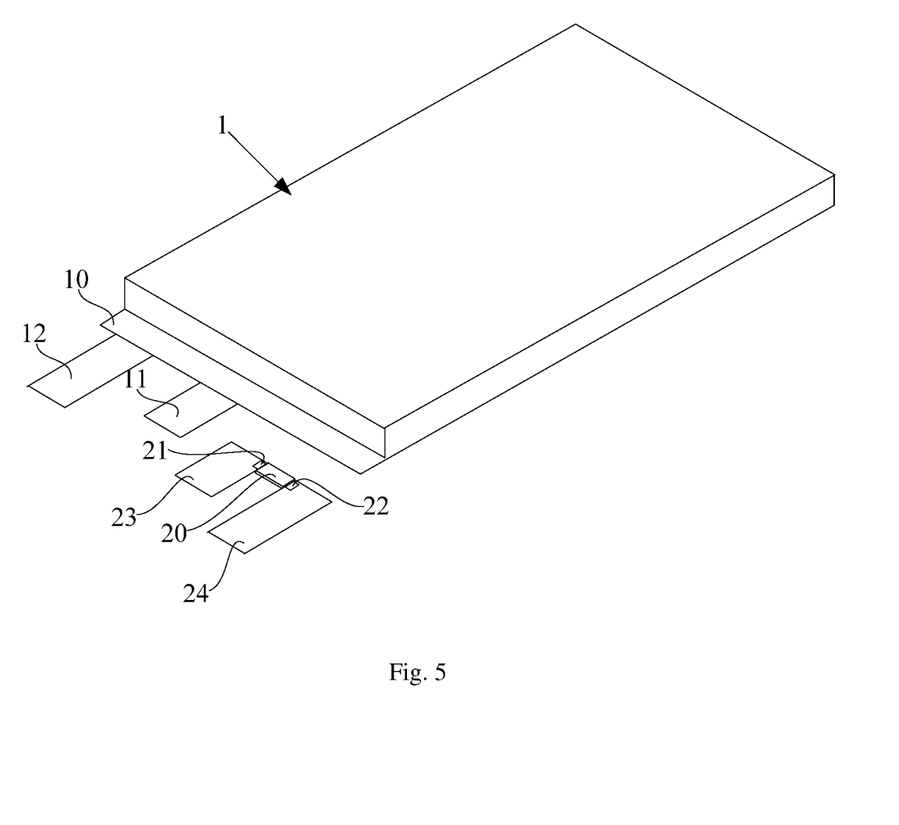
FIG. 5 is a schematic view of a structure of a cell provided by another embodiment of the present invention.

Further, as shown in FIG. 1, the second connection terminal 22 may be located between the first electrode tab 11 and the second electrode tab 12 of the body 1, that is, the choke 20 adopts a right adapter manner; of course, as shown in FIG. 5, the first electrode tab 11 of the body 1 may also be located between the second connection terminal 22 and the second electrode tab 12, that is, the choke 20 adopts a left adapter manner; specifically, the above two adapter manners do not affect the heat conduction efficiency of the connection path of the first electrode tab 11 to the choke 20.

As shown in FIGS. 1 and 2, in a specific embodiment of the present application, the first electrode tab 11 may be a positive electrode tab and the second electrode tab 12 may be a negative electrode tab; or the first electrode tab 11 is a negative electrode tab and the second electrode tab 12 is a positive electrode tab.

Then, taking a cell with a capacitance of 3 Ah as an example, overcharging of the cells in the following examples are tested, and the safety of each cell is analyzed through test results; specifically, the operation of the overcharge test is performed by overcharging to 12 V at a rate of 1 C and holding at a voltage of 12 V for 2 hours. Among them, Embodiments 1 to 5 are specific embodiments of several types of cells provided by the present invention, and Comparative Examples is specific embodiments of a cell in the prior art. It should be noted that, in the following Embodiments 1 to 5, for the description of the cell structure, the portions not mentioned are the same as the corresponding portions in Comparative Examples, that is, the description in each of Embodiments only describes the distinguishing portions thereof with respect to Comparative Examples.

Comparative Example: the choke is connected to the first electrode tab through the first connection terminal and the adapter piece; the first connection terminal and the adapter piece are prepared from a Ni material; the connection path of the choke to the first electrode tab is connected by welding, and the weld area of each weld zone is less than 10% of the overlap area of the two weld bodies; the length of the connection path from the choke to the first electrode tab is 10 mm, which does not satisfy the formula $L\cdot\alpha<(T_2-T_1)$; the thermally conductive path from the body to the choke is covered with a DuPont paper.

Embodiment 1

The choke is connected to the first electrode tab only through the first connection terminal, and the length of the connection path of the choke to the first electrode tab is 6 mm, which satisfies the formula $L\cdot\alpha<(T_2-T_1)$.

Embodiment 2

The first connection terminal and the adapter piece are made of a Cu material.

Embodiment 3 the connection path of the choke to the first electrode tab is connected by welding, and the weld area of each weld zone is equal to 20% of the overlap area of the two weld bodies.

Embodiment 4

The length of the connection path of the choke to the first electrode tab is 6 mm, which satisfies the formula $L\cdot\alpha<(T_2-T_1)$.

Embodiment 5

The thermally conductive path from the body to the choke is covered with a porous material.

Table 1 shows the test results of passing rate of the overcharge test for each cell, wherein the denominator in each data is the number of overcharge tests and the numerator is the number of times passing the overcharge test. As can be seen from Table 1, passing rate of the overcharge test of several types of cells provided by the embodiments of the present invention (Embodiments 1 to 5) is significantly improved compared with the pass rate of the overcharge test of the conventional cells in the prior art (Comparative Example), that is, among the several types of cells provided by the embodiments of the present invention (Embodiments 1 to 5), the choke may prevent the body of the cell from reaching the overcharge state and achieve the effect of protecting the cell in a timely and effective manner.

TABLE 1

Passing Rate of Overcharge Test for Embodiments and Comparative Example

| Groups | Embodiment 1 | Embodiment 2 | Embodiment 3 | Embodiment 4 | Embodiment 5 | Comparative Examples |
|---|---|---|---|---|---|---|
| passing rate of the overcharge test at 1 C/12 V | 10/10 | 6/10 | 7/10 | 10/10 | 7/10 | 0/10 |

In addition, the embodiments of the present invention further provide a battery comprising the cell according to any one of above embodiments. In the battery provided by the embodiments of the present invention, the cell is not easy to overcharge and has a high safety.

It will be apparent to those skilled in the art that various modifications and variations of embodiments of the present invention can be made without departing from the spirit or scope of the invention. If these various modifications and variations of the present invention belong to the scope of the claim and equivalent technical scope, the invention is intended to comprise these modifications and variations.

What is claimed is:

1. A cell, comprising:
 a body comprising a first electrode tab;
 a choke;
 the choke is coupled to the first electrode tab, wherein the choke is directly electrically connected to the first electrode tab.

2. The cell according to claim 1, wherein the choke is triggered at a first temperature to reduce a current passing through it;
 a product of a length of the path and a cooling coefficient of the path is less than a difference between a second temperature of the first electrode tab and the first temperature.

3. The cell according to claim 2, wherein the cooling coefficient of the connection path is between 0.5° C./mm and 1.5° C./mm.

4. The cell according to claim 1, wherein the choke includes a thermistor, and the thermistor is coupled to a protection circuit to reduce a current passing through the protection circuit when the choke is triggered.

5. The cell according to claim 1, further comprising a connection terminal, the choke is electrically connected to the connection terminal;
the body further includes a second electrode tab opposite to the first electrode tab; the connection terminal is located between the first electrode tab and the second electrode tab; or the first electrode tab is located between the second electrode tab and the connection terminal.

6. A battery, wherein the battery comprising a cell;
the cell comprising:
a body comprising a first electrode tab;
a choke; and
a first connection terminal;
wherein, the choke is electrically connected to the first connection terminal, and the first connection terminal is electrically connected to the first electrode tab;
the choke is coupled to the first electrode tab, and a length of a connection path of the choke coupled to the first electrode tab is in a range between 0 to 6 nm.

7. The battery according to claim 6, further comprising an adapter piece, the first connection terminal is electrically connected to the adapter piece, and the adapter piece is electrically connected to the first electrode tab.

8. The battery according to claim 7, wherein the connection path of the choke to the first electrode tab is connected by welding, and a weld area of each weld zone is not less than 10% of a overlap area of the two weld bodies in the weld zone.

9. The battery according to claim 7, wherein materials of the first connection terminal and the adapter piece are copper.

10. The battery according to claim 7, wherein surfaces of the first connection terminal and the adapter piece are coated with any one selected from the group consisting of diamond, graphite, and silicon material.

11. The battery according to claim 7, wherein any one selected from the group consisting of an outer portion of the first connection terminal, an outer portion of the adapter piece, and an outer portion of the first electrode tab is covered with a porous material layer.

12. A cell, comprising:
a body comprising a first electrode tab;
a choke, wherein the choke is coupled to the first electrode tab, and a length of a connection path of the choke coupled to the first electrode tab is in a range between 0 to 6 nm;
a first connection terminal, wherein the choke is electrically connected to the first connection terminal and the first connection terminal is electrically connected to the first electrode tab; and
an adapter piece, wherein the first connection terminal is electrically connected to the adapter piece, and the adapter piece is electrically connected to the first electrode tab;
wherein surfaces of the first connection terminal and the adapter piece are coated with any one selected from the group consisting of diamond, graphite, and silicon material.

13. A cell, comprising:
a body comprising a first electrode tab;
a choke, wherein the choke is coupled to the first electrode tab, and a length of a connection path of the choke coupled to the first electrode tab is in a range between 0 to 6 nm;
a first connection terminal, wherein the choke is electrically connected to the first connection terminal, and the first connection terminal is electrically connected to the first electrode tab; and
an adapter piece, wherein the first connection terminal is electrically connected to the adapter piece, and the adapter piece is electrically connected to the first electrode tab;
wherein any one selected from the group consisting of an outer portion of the first connection terminal, an outer portion of the adapter piece, and an outer portion of the first electrode tab is covered with a porous material layer.

14. A cell, comprising:
a body comprising a first electrode tab and a second electrode tab opposite to the first electrode tab;
a choke, wherein the choke is coupled to the first electrode tab, and a length of a connection path of the choke coupled to the first electrode tab is in a range between 0 to 6 nm;
a connection terminal, wherein the choke is electrically connected to the connection terminal; and
wherein the connection terminal is located between the first electrode tab and the second electrode tab, or the first electrode tab is located between the second electrode tab and the connection terminal.

15. The cell according to claim 14, further comprising an adapter piece, the first connection terminal is electrically connected to the adapter piece, and the adapter piece is electrically connected to the first electrode tab.

16. The cell according to claim 15, wherein the connection path of the choke to the first electrode tab is connected by welding, and a weld area of each weld zone is not less than 10% of an overlap area of the two weld bodies in the weld zone.

17. The cell according to claim 15, wherein materials of the first connection terminal and the adapter piece are copper.

18. The cell according to claim 15, wherein surfaces of the first connection terminal and the adapter piece are coated with any one selected from the group consisting of diamond, graphite, and silicon material.

* * * * *

UNITED STATES PATENT AND TRADEMARK OFFICE
CERTIFICATE OF CORRECTION

PATENT NO. : 10,879,520 B2
APPLICATION NO. : 16/134010
DATED : December 29, 2020
INVENTOR(S) : Nan et al.

Page 1 of 1

It is certified that error appears in the above-identified patent and that said Letters Patent is hereby corrected as shown below:

In the Claims

Claim 6, Column 9, Line 24, please delete "0 to 6 nm" and insert --0 to 6 mm--;

Claim 12, Column 9, Line 51, please delete "0 to 6 nm" and insert --0 to 6 mm--;

Claim 13, Column 10, Line 14, please delete "0 to 6 nm" and insert --0 to 6 mm--;

Claim 14, Column 10, Line 34, please delete "0 to 6 nm" and insert --0 to 6 mm--.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*